US010436974B2

(12) United States Patent
Lv et al.

(10) Patent No.: US 10,436,974 B2
(45) Date of Patent: Oct. 8, 2019

(54) BACKLIGHT MODULE AND DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Jinku Lv, Beijing (CN); Yutao Hao, Beijing (CN); Ying Chen, Beijing (CN); Jian Li, Beijing (CN); Donglei Li, Beijing (CN); Bochang Wang, Beijing (CN); Zhanchang Bu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/763,831

(22) PCT Filed: Aug. 21, 2017

(86) PCT No.: PCT/CN2017/098279
§ 371 (c)(1),
(2) Date: Mar. 27, 2018

(87) PCT Pub. No.: WO2018/126701
PCT Pub. Date: Jul. 12, 2018

(65) Prior Publication Data
US 2019/0049654 A1    Feb. 14, 2019

(30) Foreign Application Priority Data

Jan. 4, 2017 (CN) .................... 2017 2 0008398 U

(51) Int. Cl.
*F21V 8/00* (2006.01)
*G02B 6/00* (2006.01)

(52) U.S. Cl.
CPC ............. *G02B 6/0076* (2013.01); *G02B 6/00* (2013.01); *G02B 6/0038* (2013.01); *G02B 6/0068* (2013.01)

(58) Field of Classification Search
None
See application file for complete search history.

(56) References Cited

U.S. PATENT DOCUMENTS

2003/0184990 A1* 10/2003 Lin ..................... B60K 35/00
                                                              362/616
2008/0112187 A1    5/2008 Katsumata et al.
(Continued)

FOREIGN PATENT DOCUMENTS

CN    202791597 U    3/2013
CN    103225773 A    7/2013
(Continued)

OTHER PUBLICATIONS

International Search Report received for PCT Patent Application No. PCT/CN2017/098279, dated Nov. 16, 2017, 7 pages (2 pages of English Translation and 5 pages of Original Document).

*Primary Examiner* — Elmito Breval
(74) *Attorney, Agent, or Firm* — Womble Bond Dickinson (US) LLP

(57) ABSTRACT

The embodiments of the present disclosure provide a backlight module and a display device, which increase the brightness range of the lateral entrance backlight module, thereby improving the HDR display effect of the display device. The backlight module in the embodiment of the present disclosure includes at least two lateral entrance light guide plates, each lateral entrance light guide plate is provided with a light bar. The number of light bars of the (Continued)

backlight module is increased, thereby increasing the maximum brightness of the backlight module. The overall brightness variation range of the backlight module is thus increased. In addition, the light bar of each lateral entrance light guide plate can be separately controlled, thereby increasing the brightness range of the backlight module. Therefore, the backlight module provided by this solution can effectively improve the HDR display effect of the display device.

13 Claims, 3 Drawing Sheets

(56) References Cited

U.S. PATENT DOCUMENTS

| | | | | |
|---|---|---|---|---|
| 2010/0073955 | A1* | 3/2010 | Cornelissen | G02B 6/0038 362/554 |
| 2010/0157197 | A1 | 6/2010 | Lee et al. | |
| 2012/0032997 | A1* | 2/2012 | Cha | H04N 13/305 345/690 |
| 2012/0075326 | A1* | 3/2012 | Tsuchiya | G02B 6/0058 345/589 |
| 2013/0033901 | A1* | 2/2013 | Nishitani | G02B 6/0036 362/613 |
| 2013/0176749 | A1* | 7/2013 | Chen | G02B 6/006 362/612 |
| 2014/0043377 | A1* | 2/2014 | Tanaka | G02B 6/0053 345/690 |
| 2014/0301109 | A1* | 10/2014 | Kim | G02B 6/0063 362/616 |
| 2015/0316227 | A1* | 11/2015 | Sahlin | B60Q 1/0058 362/511 |
| 2016/0363714 | A1* | 12/2016 | Zhou | G02B 6/0055 |

FOREIGN PATENT DOCUMENTS

| | | |
|---|---|---|
| CN | 106094095 A | 11/2016 |
| CN | 206301061 U | 7/2017 |

* cited by examiner

BACKLIGHT MODULE AND DISPLAY PANEL

RELATED APPLICATIONS

The present application is the U.S. national phase entry of the international application PCT/CN2017/098279, with an international filing date of Aug. 21, 2017, which claims the benefit of Chinese Patent Application No. 201720008398.2, filed on Jan. 4, 2017, the entire disclosures of which are incorporated herein by reference.

TECHNICAL FIELD

The present disclosure relates to the field of display technology, and particularly to a backlight module and a display device.

BACKGROUND

An HDR (high dynamic range) image generally refers to an image with a very wide range of display brightness, and people often refer to a technique for generating and displaying a high dynamic range image as HDR technology. When generating and displaying high dynamic range images, it is important to make the image have sufficient brightness, and the brightness of the image has a large dynamic range.

At present, HDR technology is used in products such as liquid crystal displays or LCD TVs, which can greatly improve the image quality. However, in order to make full use of the advantages of HDR, higher requirements have been placed on the backlight module of liquid crystal display devices. Since the lateral entrance backlight module meets the thin requirements of current display devices and can provide a high-brightness and uniform planar light source, most liquid crystal display devices apply lateral entrance backlight modules.

In the prior art, a lateral entrance backlight module generally includes a light guide plate and a light bar disposed on a light incident surface of the light guide plate. Since the installation space of the light bar is limited, in order to reduce the influence of heat concentration, the number of light emitting diodes of the light bar is limited. Therefore, the brightness range of the backlight module is limited, and the backlight module cannot meet the brightness requirement of HDR.

Therefore, how to increase the brightness range of the lateral entrance backlight module and improve the HDR display effect of the display device is a technical problem to be solved by those skilled in the art.

SUMMARY

The embodiments of the present disclosure provide a backlight to module and a display device, which increase the brightness range of the lateral entrance backlight module, thereby improving the HDR display effect of the display device.

The backlight module provided by the present disclosure includes at least two stacked lateral entrance light guide plates, and light bars respectively arranged on light incident surfaces of the lateral entrance light guide plates. A bottom surface of each lateral entrance light guide plate has optical lattice points.

Optionally, each lateral entrance light guide plate has a light incident surface, and the light incident surfaces of two adjacent lateral entrance light guide plates are perpendicular to each other.

In this optional solution, the light incident surfaces of two adjacent lateral entrance light guide plates are perpendicular to each other, and mutually perpendicular light rays can form a plurality of cross points. The brightness of each cross point can be separately adjusted, which is favorable for increasing the brightness range of the entire display screen.

Optionally, a top surface of each lateral entrance light guide plate has a plurality of strip-shaped microstructures arranged in parallel, and an extending direction of the strip-shaped microstructures is perpendicular to the light incident surface of the lateral entrance light guide plate.

In this optional solution, the stripe-shaped microstructure has a good light-gathering property, which can accurately adjust the brightness of the target area and further improve the HDR display effect.

Optionally, in a plane perpendicular to the extending direction, a cross-sectional shape of the strip-shaped microstructure is a circular segment, a semicircle, or a triangle.

Optionally, each lateral entrance light guide plate has two opposite light incident surfaces, and light incident surfaces of two adjacent lateral entrance light guide plates are perpendicular to each other.

Specifically, the number of the lateral entrance light guide plates is two.

Optionally, the thicknesses of the lateral entrance light guide plates to are the same.

Optionally, the materials of the lateral entrance light guide plates are the same.

The present disclosure also provides a display device including the backlight module described in any of the above mentioned solutions.

The display device in this embodiment includes the backlight module described above. The display device has a large brightness range and therefore has a good display effect.

Specifically, the display device is an HDR display device.

DETAILED DESCRIPTION OF THE DISCLOSURE

In order to increase the brightness range of the lateral entrance backlight module and further improve the HDR display effect of the display device, embodiments of the present disclosure provide a backlight module and a display device. To make the objectives, technical solutions, to and advantages of the present disclosure more clear, the following embodiments further illustrate the present disclosure in detail.

Figure 1:
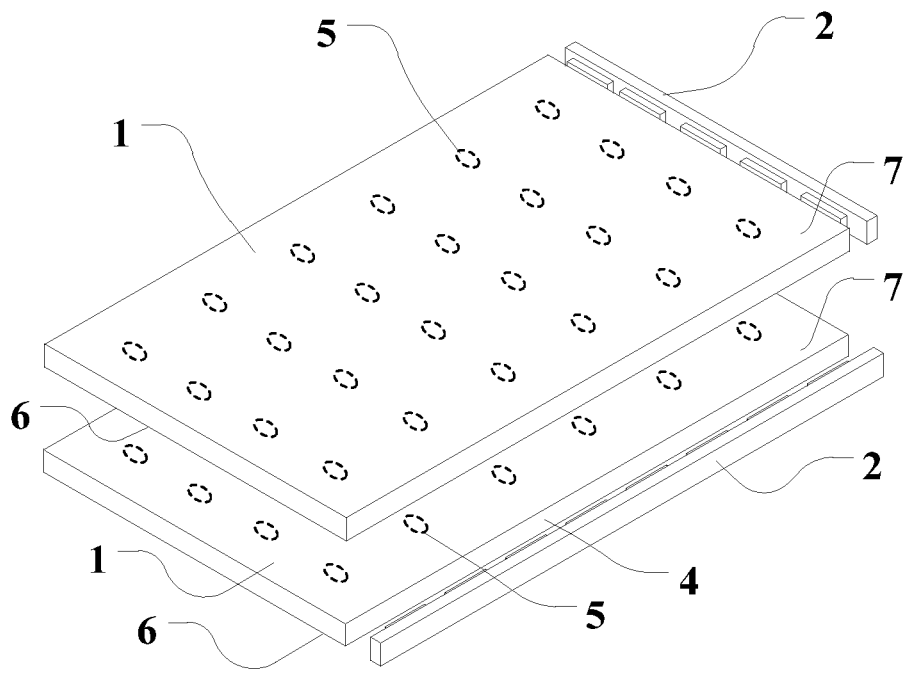
FIG. 1 is a schematic diagram of a backlight module according to an embodiment of the present disclosure.

Referring to FIG. 1, an embodiment of the present disclosure provides a backlight module. The backlight module provided by the present disclosure includes at least two stacked lateral entrance light guide plates 1, and light bars 2 respectively arranged on the light incident surfaces 4 of the lateral entrance light guide plates 1. A bottom surface 6 of each lateral entrance light guide plate 1 has optical lattice points 5. For a lateral entrance light guide plates 1, a top surface 7 of the lateral entrance light guide plates 1 is a light exit surface of the lateral entrance light guide plates 1. The bottom surface 6 is opposite to the top surface 7.

The light incident surface of the lateral entrance light guide plate is a lateral surface of the guide light plate and is used to input light into the light guide plate. The optical lattice points on the bottom surface of the lateral entrance light guide plate can be designed according to the optical specifications of the light incident surface and the light bar of the lateral entrance light guide plate.

The backlight module in the embodiment of the present disclosure includes at least two lateral entrance light guide plates 1, each lateral entrance light guide plate 1 is provided with a light bar 2. The number of light bars 2 of the backlight module is increased, thereby increasing the maximum brightness of the backlight module. The overall brightness variation range of the backlight module is thus increased. In addition, the light bar 2 of each lateral entrance light guide plate 1 can be separately controlled, thereby increasing the brightness range of the backlight module. Therefore, the backlight module provided by this solution can effectively improve the HDR display effect of the display device.

With continued reference to FIG. 1, in an optional embodiment, each lateral entrance light guide plate 1 has a light incident surface 4, and the light incident surfaces 4 of two adjacent lateral entrance light guide plates 1 are perpendicular to each other.

Figure 4A:
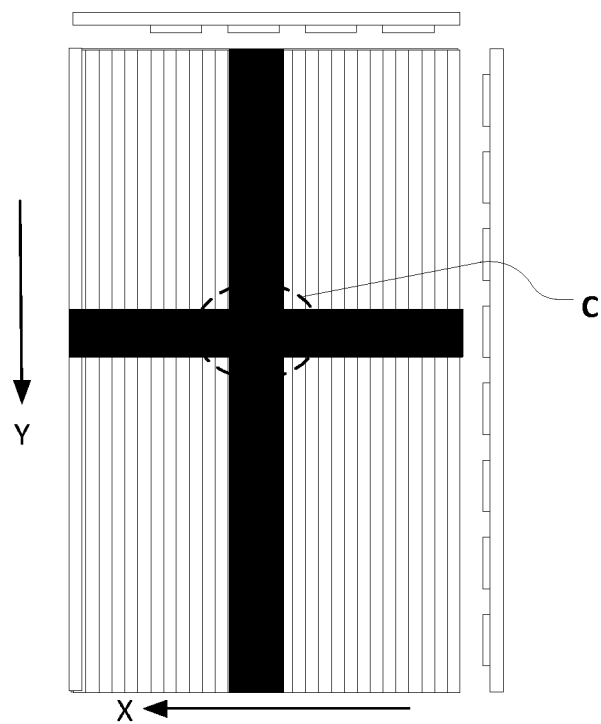
FIG. 4a is a schematic diagram of a grayscale state of lateral entrance light guide plates in a backlight module according to an embodiment of the present disclosure.
Figure 4B:
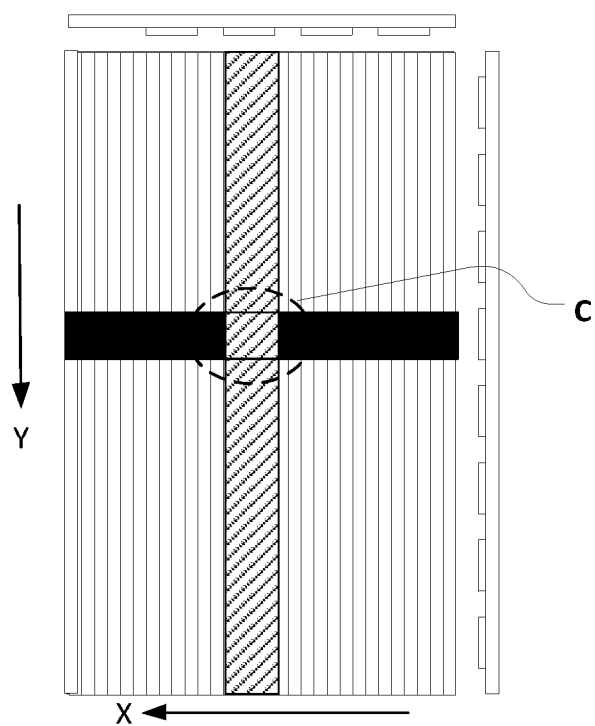
FIG. 4b is a schematic diagram of a grayscale state of lateral entrance light guide plates in a backlight module according to another embodiment of the present disclosure.
Figure 4C:
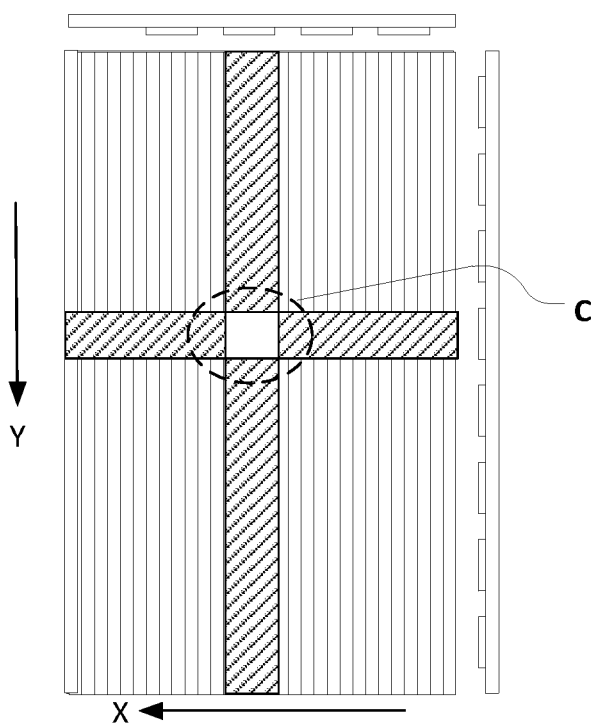
FIG. 4c is a schematic diagram of a grayscale state of lateral entrance light guide plates in a backlight module according to yet another embodiment of the present disclosure.

In this optional embodiment, the light incident surfaces of two adjacent lateral entrance light guide plates 1 are perpendicular to each other, and the mutually perpendicular light rays entering from the light incident surfaces are staggered to form a plurality of cross points, and the brightness of each cross point can be adjusted separately. Brightness adjustment of a cross point has little influence on the surrounding brightness. Specifically, as shown in FIG. 4a, when there is no light in two mutually perpendicular directions (indicated with "X" and "Y" in FIGS. 4a-4c), the brightness of the cross point (indicated with "C" in FIGS. 4a-4c) is 0 brightness; as shown in FIG. 4b, when there is light in one direction of two mutually perpendicular directions, the brightness of the cross point is 50% brightness; as shown in FIG. 4c, when there is light in both of the mutually perpendicular directions, the brightness of the cross point is 100% brightness. Combined with the control of the surrounding light, the grayscale of respective cross points can be adjusted.

To obtain 100% brightness at a cross point, combination of two light rays is required. In some embodiments, the light incident surfaces of two adjacent lateral entrance light guide plates are perpendicular to each other, so that the beam propagation directions inside the adjacent two lateral entrance light guide plates are perpendicular to each other. The mutually perpendicular beams can enhance the brightness of the cross point, and affect the brightness of the area outside the cross point as little as possible.

Those skilled in the art can understand that an optical structure such as a lens can be used to increase the directivity of the light beam emitted from the light bar 2, thereby obtaining a cross point with a high-brightness.

Figure 2:
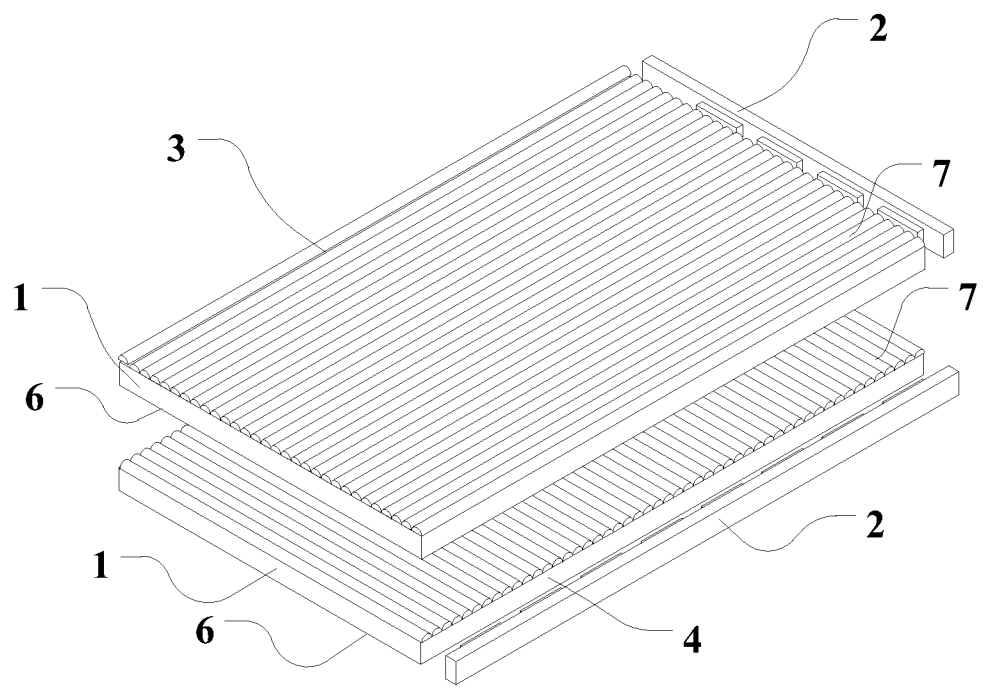
FIG. 2 is a schematic diagram of a backlight module according to another embodiment of the present disclosure.
Figure 3:
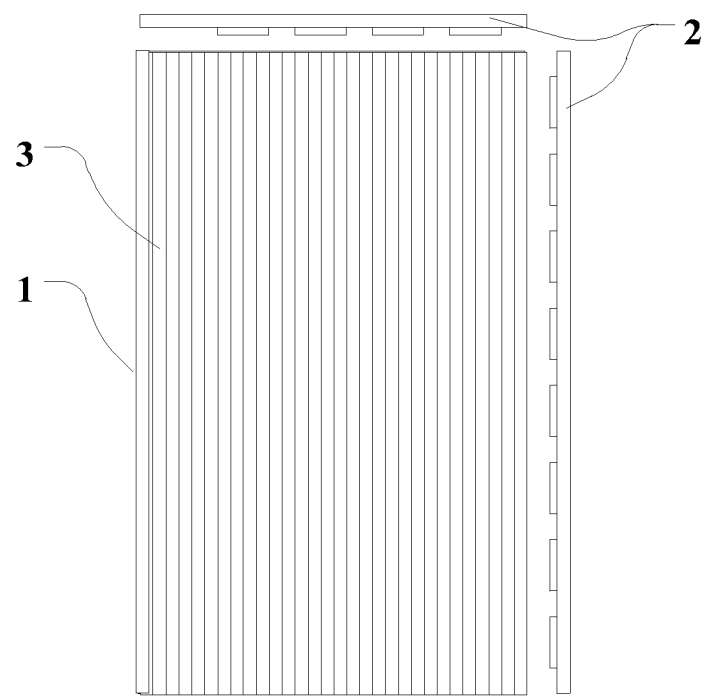
FIG. 3 is a top view of a backlight module according to an embodiment of the present disclosure.

Referring to FIG. 2 and FIG. 3, a top surface of each lateral entrance light guide plate 1 has a plurality of strip-shaped microstructures 3 arranged in parallel, and an extending direction of the strip-shaped microstructures 3 is perpendicular to the light incident surface of the lateral entrance light guide plate 1.

In this optional solution, the stripe-shaped microstructure 3 has a good light-gathering property, which can accurately adjust the brightness of the target area and further improve the HDR display effect.

In the above mentioned solution, in a plane perpendicular to the extending direction, a cross-sectional shape of the strip-shaped microstructure 3 is a circular segment, a semicircle, or a triangle, which can be selected according to actual conditions.

In another embodiment, each lateral entrance light guide plate 1 has two opposite light incident surfaces, and light incident surfaces of two adjacent lateral entrance light guide plates 1 are perpendicular to each other.

In an embodiment, the number of the lateral entrance light guide plates 1 is two. In this way, the thinness requirement of the display module can be satisfied, and it can also meet the HDR display requirements to some extent.

In an optional embodiment, the thicknesses of the lateral entrance light guide plates 1 are the same, and the materials of the lateral entrance light guide plates 1 are the same. Applying the lateral entrance light guide plates 1 with the same specification can facilitate the manufacture.

The present disclosure also provides a display device including the backlight module described in any of the above mentioned solutions.

The display device in this embodiment includes the backlight module described above. The display device has a large brightness range and therefore has a good display effect.

Further, the display device is an HDR display device. In this way, it takes full advantage of the backlight module, providing a good HDR display effect and high-quality images.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A backlight module, comprising: at least two stacked lateral entrance light guide plates, and light bars respectively arranged on light incident surfaces of the lateral entrance light guide plates; wherein a bottom surface of each lateral entrance light guide plate has optical lattice points;

wherein each lateral entrance light guide plate has a light incident surface, and light incident surfaces of two adjacent lateral entrance light guide plates are perpendicular to each other; a top surface of each lateral entrance light guide plate has a plurality of strip-shaped microstructures arranged in parallel, and an extending direction of the strip-shaped microstructures is perpendicular to the light incident surface of the lateral entrance light guide plate.

2. The backlight module according to claim 1, wherein in a plane perpendicular to the extending direction, a cross-sectional shape of the strip-shaped microstructure is a circular segment, a semicircle, or a triangle.

3. The backlight module according to claim 1, wherein each lateral entrance light guide plate has two opposite light incident surfaces, and light incident surfaces of two adjacent lateral entrance light guide plates are perpendicular to each other.

4. The backlight module according to claim 1, wherein a number of the lateral entrance light guide plates is two.

5. The backlight module according to claim 1, wherein thicknesses of the lateral entrance light guide plates are the same.

6. The backlight module according to claim 1, wherein materials of the lateral entrance light guide plates are the same.

7. A display device comprising the backlight module according to claim 1.

8. The display device according to claim 7, wherein the display device is an HDR display device.

9. The display device according to claim 7, wherein in a plane perpendicular to the extending direction, a cross-sectional shape of the strip-shaped microstructure is a circular segment, a semicircle, or a triangle.

10. The display device according to claim 7, wherein each lateral entrance light guide plate has two opposite light incident surfaces, and light incident surfaces of two adjacent lateral entrance light guide plates are perpendicular to each other.

11. The display device according to claim 7, wherein a number of the lateral entrance light guide plates is two.

12. The display device according to claim 7, wherein thicknesses of the lateral entrance light guide plates are the same.

13. The display device according to claim 7, wherein materials of the lateral entrance light guide plates are the same.

* * * * *